(12) United States Patent
Shoarinejad et al.

(10) Patent No.: US 10,623,392 B2
(45) Date of Patent: *Apr. 14, 2020

(54) SYSTEMS AND METHODS FOR RFID SECURITY

(71) Applicant: KNAPP INVESTMENT COMPANY LIMITED, Road Town (VG)

(72) Inventors: Kambiz Shoarinejad, Tustin, CA (US); Maryam Soltan, Tustin, CA (US)

(73) Assignee: KNAPP INVESTMENT COMPANY LIMITED, Road Town (VG)

( * ) Notice: Subject to any disclaimer, the term of this patent is extended or adjusted under 35 U.S.C. 154(b) by 0 days.

This patent is subject to a terminal disclaimer.

(21) Appl. No.: 16/214,126

(22) Filed: Dec. 9, 2018

(65) Prior Publication Data

US 2019/0182228 A1    Jun. 13, 2019

Related U.S. Application Data

(63) Continuation of application No. 15/472,029, filed on Mar. 28, 2017, now Pat. No. 10,164,959, which is a continuation of application No. 14/809,031, filed on Jul. 24, 2015, now Pat. No. 9,628,466, which is a continuation of application No. 14/286,868, filed on
(Continued)

(51) Int. Cl.
| | | |
|---|---|---|
| *G08B 13/14* | (2006.01) | |
| *H04L 29/06* | (2006.01) | |
| *G06Q 20/40* | (2012.01) | |
| *G07F 7/10* | (2006.01) | |
| *G07F 7/12* | (2006.01) | |
| *H04L 9/12* | (2006.01) | |
| *H04L 9/32* | (2006.01) | |
| *G06K 7/00* | (2006.01) | |
| *G06K 7/10* | (2006.01) | |
| *G06Q 20/20* | (2012.01) | |

(Continued)

(52) U.S. Cl.
CPC ........... *H04L 63/08* (2013.01); *G06K 7/00* (2013.01); *G06K 7/10257* (2013.01); *G06Q 20/206* (2013.01); *G06Q 20/3278* (2013.01); *G06Q 20/3829* (2013.01); *G06Q 20/409* (2013.01); *G06Q 20/40145* (2013.01); *G07F 7/10* (2013.01); *G07F 7/12* (2013.01); *H04L 9/12* (2013.01); *H04L 9/3226* (2013.01); *H04L 9/3231* (2013.01); *H04L 63/0428* (2013.01); *H04L 63/0876* (2013.01); *H04L 2209/805* (2013.01)

(58) Field of Classification Search
CPC ........... H04Q 5/22; H04L 62/08; G06Q 20/40
USPC .......... 340/572.1, 10.2, 10.4, 5.8, 5.82; 235/375; 726/4
See application file for complete search history.

(56) References Cited

U.S. PATENT DOCUMENTS

| | | | | |
|---|---|---|---|---|
| 7,246,744 B2 * | 7/2007 | O'Brien | ............. | G07C 9/00103 235/382 |
| 7,303,120 B2 * | 12/2007 | Beenau | ................ | G01D 21/00 235/380 |

(Continued)

*Primary Examiner* — Toan N Pham
(74) *Attorney, Agent, or Firm* — Anova Law Group, PLLC

(57) ABSTRACT

An RFID system includes an RFID tag, an RFID reader, and a server. The RFID tag communicates to the server via encrypted information. The information may be encrypted with synchronized encryption keys. In this manner, the reader need not decrypt the information from the RFID tag. The effectiveness of malicious readers is thereby reduced, resulting in improved RFID tag security.

20 Claims, 5 Drawing Sheets

Related U.S. Application Data

May 23, 2014, now Pat. No. 9,104,926, which is a continuation of application No. 13/692,327, filed on Dec. 3, 2012, now Pat. No. 8,736,424, which is a continuation of application No. 13/333,778, filed on Dec. 21, 2011, now Pat. No. 8,325,043, which is a continuation of application No. 13/118,203, filed on May 27, 2011, now Pat. No. 8,085,149, which is a continuation of application No. 12/349,717, filed on Jan. 7, 2009, now Pat. No. 7,952,481, which is a continuation of application No. 11/386,540, filed on Mar. 21, 2006, now Pat. No. 7,492,258.

(51) Int. Cl.
*G06Q 20/32* (2012.01)
*G06Q 20/38* (2012.01)

(56) References Cited

U.S. PATENT DOCUMENTS

| | | | |
|---|---|---|---|
| 7,492,258 B1* | 2/2009 | Shoarinejad | G06Q 20/409 340/572.1 |
| 7,952,481 B2* | 5/2011 | Shoarinejad | G06Q 20/409 340/572.1 |
| 2005/0134461 A1* | 6/2005 | Gelbman | G06K 7/10079 340/572.8 |
| 2006/0032901 A1* | 2/2006 | Sugiyama | G07C 9/00103 235/375 |

* cited by examiner

SYSTEMS AND METHODS FOR RFID SECURITY

CLAIM OF BENEFIT TO PRIOR APPLICATIONS

This Application is a continuation of and claims priority from U.S. patent application Ser. No. 15/472,029, filed Mar. 28, 2017, issued as U.S. Pat. No. 10,164,959. U.S. patent application Ser. No. 15/472,029 is a continuation of and claims priority from U.S. patent application Ser. No. 14/809, 031, filed Jul. 24, 2015, issued as U.S. Pat. No. 9,628,466. U.S. patent application Ser. No. 14/809,031 is a continuation of and claims priority from U.S. patent application Ser. No. 14/286,868, filed May 23, 2014, issued as U.S. Pat. No. 9,104,926. U.S. patent application Ser. No. 14/286,868 is a continuation of and claims priority from U.S. patent application Ser. No. 13/692,327, filed Dec. 3, 2012, issued as U.S. Pat. No. 8,736,424. U.S. patent application Ser. No. 13/692, 327 is a continuation of and claims priority from U.S. patent application Ser. No. 13/333,778, filed Dec. 21, 2011, issued as U.S. Pat. No. 8,325,043. U.S. patent application Ser. No. 13/333,778 is a continuation of and claims priority from U.S. patent application Ser. No. 13/118,203, filed May 27, 2011, issued as U.S. Pat. No. 8,085,149. U.S. patent application Ser. No. 13/118,203 is a continuation of and claims priority from U.S. patent application Ser. No. 12/349,717, filed Jan. 7, 2009, issued as U.S. Pat. No. 7,952,481. U.S. patent application Ser. No. 12/349,717 is a continuation of and claims priority from U.S. patent application Ser. No. 11/386,540, filed Mar. 21, 2006, issued as U.S. Pat. No. 7,492,258. U.S. Pat. Nos. 10,164,959; 9,628,466; 9,104,926; 8,736,424; 8,325,043; 8,085,149; 7,952,481; and 7,492,258 are incorporated herein by reference.

BACKGROUND

The present invention relates to radio frequency identification (RFID), and in particular, to systems and methods for RFID security.

RFID systems are useful in a wide variety of applications. RFID systems are radio communication systems that include small low cost electronic devices that store information including identification (ID) information, for example. These devices are referred to as RFID tags. The RFID tags may be designed using backscattering circuit techniques, for example, so that another device can retrieve the ID wirelessly. The retrieving device is typically referred to as a "reader", and sometimes as an "interrogator". The tags are typically very small, and may be placed on a variety of items including equipment, products, or even people, for example, and identification of such items may be made through a reader. Accordingly, RFID systems may be used to track inventory in a warehouse, the number of products on store shelves, or the location of equipment in a company, to name just a few example applications.

RFID systems may include large numbers of tags and readers spread out across potentially wide areas. The large number of tags and readers may result in a correspondingly large volume of information that may need to be processed. Such information may include large volumes of tag IDs. In order to process such information, powerful readers are typically used that include complex software capable of interfacing with backend systems that store and ultimately use the data.

The cost of RFID tags is decreasing in correspondence with advances in semiconductor processing and electronic circuitry technology. As such, RFID tags are being associated with a wide variety of items in increasing numbers.

As RFID tags are being incorporated on an increasing number of items, privacy concerns arise. For example, RFID tags may be attached to retail products in a store. Competitors of the store may surreptitiously read the RFID tags to obtain business intelligence regarding sales, turnover, etc. As another example, RFID tags may be attached to drivers' licenses. Entities may surreptitiously track people using such tags. RFID tags may be incorporated with financial items such as currency, gaming tokens, bank cards, credit cards, gift cards, etc. Entities may surreptitiously read the information stored on the card and attempt to use that information to perform unauthorized transactions.

These and other concerns provide a desire to improve the security of RFID tags. However, adding security features to RFID tags increases their cost. A conflict arises between security of RFID tag information and ubiquity of RFID tag deployment. Thus, there is a need for security features that may be implemented with low cost in an RFID system.

SUMMARY

In order to solve the above-noted problems and others, the present invention is directed toward systems and methods of securely transferring information, authentication, or access control in an RFID system.

According to one embodiment, a method transmits information between a RFID tag and a server. The method includes encrypting, by the RFID tag according to a predetermined scheme, identification data identifying the RFID tag, to result in encrypted RFID information. The method further includes reading, by a RFID reader, the encrypted RFID information from the RFID tag. The method further includes receiving, by the RFID reader, authentication data. The authentication data authenticates the RFID tag to the server. The method further includes transmitting, from the RFID reader to the server, a transmission that includes the encrypted RFID information and the authentication data. The method further includes decrypting, by the server according to the predetermined scheme, the encrypted RFID information to generate the identification data. The method further includes authenticating, by the server, the transmission using the authentication data and the identification data. The method further includes authorizing, by the server, the transmission using the identification data.

According to a further embodiment, the RFID tag is involved in a transaction involving the user of the RFID tag, the RFID reader, and the server listed above.

According to another embodiment, an RFID system includes the RFID tag, the RFID reader and the server listed above, and implements the method described above.

According to another embodiment, the RFID tag and the server listed above generate encryption keys for encrypting and decrypting information.

According to another embodiment, an RFID tag is part of an RFID system that also includes an RFID reader and a server. The RFID tag includes a transceiver and a processor. The transceiver communicates with the RFID reader. The processor controls the operation of the RFID tag.

In another embodiment, the present invention includes a method of transmitting information between a radio frequency identification (RFID) tag and a server, the method comprising the steps of encrypting, by the RFID tag according to a predetermined scheme, identification data identifying the RFID tag, to result in encrypted RFID information, reading, by a RFID reader, the encrypted RFID information from the RFID tag, transmitting, from the RFID reader to the server, a transmission, wherein the transmission includes the encrypted RFID information, and decrypting, by the server according to the predetermined scheme, the encrypted RFID information to produce the identification data.

In one embodiment, the present invention further comprises authorizing, by the server, the transmission using the identification data.

In one embodiment, the present invention further comprises receiving, by the RFID reader, authentication data, wherein the authentication data authenticates the RFID tag to the server, and wherein the transmission, from the RFID reader to the server, includes the authentication data, authenticating the transmission using the authentication data and the identification data by the server.

In one embodiment, the present invention comprises receiving, by the RFID reader, authentication data and transaction information, wherein the authentication data authenticates the RFID tag to the server, and wherein the transaction information relates to a transaction involving the RFID tag and the RFID reader, and the step of transmitting comprises transmitting, from the RFID reader to the server, the transmission, wherein the transmission includes the encrypted RFID information, the transaction information, and the authentication data.

In one embodiment, the present invention further comprises authenticating, by the server, the transaction using the authentication data and the identification data, and authorizing, by the server, the transaction using the identification data and the transaction information.

In one embodiment, the authentication data comprises a password, biometric information, or a pseudo-random number.

In one embodiment, the RFID tag displays an authentication code that a user of the RFID tag provides to the reader as the authentication data.

In one embodiment, the method further comprises activating the RFID tag, prior to the step of reading.

In one embodiment, the method further comprises activating the RFID tag, prior to the step of reading, with one of a switch, biometric information, or a password.

In one embodiment, the method further comprises generating, by the RFID tag prior to the step of encrypting, a pseudorandom number, wherein the step of encrypting is performed using the pseudorandom number.

In one embodiment, the method further comprises generating, by the RFID tag prior to the step of encrypting, a first pseudorandom number, wherein the step of encrypting is performed using the first pseudorandom number; and generating, by the server prior to the step of decrypting, a second pseudorandom number, wherein the second pseudorandom number corresponds to the first pseudorandom number, and wherein the step of decrypting is performed using the second pseudorandom number.

In one embodiment, the method further comprises performing, by the server, synchronization contingency processing when the step of decrypting results in a failure.

In one embodiment, the method further comprises communicating, by the reader, timing information to the RFID tag, and updating, by the RFID tag, an encryption key using the timing information, wherein the encryption key is used in the step of encrypting.

In one embodiment, the method further comprises communicating, by the server, timing information to the RFID tag, and updating, by the RFID tag, an encryption key using the timing information, wherein the encryption key is used in the step of encrypting.

In one embodiment, the RFID tag stores a first plurality of encryption keys, wherein the server stores a second plurality of encryption keys, wherein the first plurality of encryption keys corresponds to the second plurality of encryption keys, further comprises communicating, by the server via the reader, a pointer to the RFID tag, wherein the pointer points to a selected one of the first plurality of encryption keys, wherein the RFID tag uses the selected one of the first plurality of encryption keys when encrypting, and wherein the server uses a corresponding selected one of the second plurality of encryption keys when decrypting.

In one embodiment, the RFID tag stores a first plurality of encryption keys, wherein the server stores a second plurality of encryption keys, wherein the first plurality of encryption keys corresponds to the second plurality of encryption keys, further comprises communicating, by the reader, a pointer to the RFID tag, wherein the pointer points to a selected one of the first plurality of encryption keys, and wherein the RFID tag uses the selected one of the first plurality of encryption keys when encrypting; and communicating, by the reader, the pointer to the server, wherein the pointer points to a corresponding selected one of the second plurality of encryption keys, and wherein the server uses the corresponding selected one of the second plurality of encryption keys when decrypting.

In one embodiment, the server generates an encryption key and transmits the encryption key to the RFID tag, wherein the RFID tag uses the encryption key when encrypting, and wherein the server uses the encryption key when decrypting.

In one embodiment, the server generates an encryption key and transmits the encryption key to the RFID tag, wherein the RFID tag updates the encryption key according to a defined process to result in an updated encryption key, wherein the RFID tag uses the updated encryption key when encrypting, wherein the server updates the encryption key according to the defined process to result in the updated encryption key, and wherein the server uses the updated encryption key when decrypting.

In one embodiment, the step of reading is performed by backscattering.

In another embodiment, the current invention includes a radio frequency identification (RFID) system, the RFID system comprising an RFID tag, an RFID reader that communicates with the RFID tag, and a server that communicates with the RFID reader, wherein the RFID tag encrypts, according to a predetermined scheme, identification data identifying the RFID tag, to result in encrypted RFID information, wherein the RFID reader reads the encrypted RFID information from the RFID tag, wherein the RFID reader transmits a transmission to the server, wherein the transmission includes the encrypted RFID information, and wherein the server decrypts, according to the predetermined scheme, the encrypted RFID information to produce the identification data.

In one embodiment, the server authorizes the transmission using the identification data.

In one embodiment, the RFID reader receives authentication data, wherein the transmission, from the RFID reader to the server, includes the authentication data, and wherein the authentication data authenticates the RFID tag to the server.

In one embodiment, the server authenticates the transmission using the authentication data and the identification data.

In one embodiment, the RFID reader receives the authentication data and transaction information, wherein the transaction information relates to a transaction involving the RFID tag and the RFID reader, the transmission includes the encrypted RFID information, the transaction information, and the authentication data, the server authenticates the transaction using the authentication data and the identification data, and the server authorizes the transaction using the identification data and the transaction information.

In one embodiment, the RFID tag comprises a transceiver that communicates with the RFID reader, and a processor, coupled to the transceiver, that encrypts, according to the predetermined scheme, the identification data.

In one embodiment, the RFID tag comprises a transceiver that communicates with the RFID reader, a memory that stores a plurality of encryption keys, and a processor, coupled to the transceiver and to the memory, that encrypts, according to the predetermined scheme, the identification data using a selected one of the plurality of encryption keys.

In one embodiment, the RFID tag comprises a switch that activates the RFID tag, a transceiver that communicates with the RFID reader when the RFID tag is active, and a processor, coupled to the switch and to the transceiver, that encrypts, according to the predetermined scheme, the identification data.

In one embodiment, the RFID tag comprises a switch that activates the RFID tag, wherein the switch includes one of a physical toggle, a biometric sensor, or a password processing system, a transceiver that communicates with the RFID reader when the RFID tag is active, and a processor, coupled to the switch and to the transceiver, that encrypts, according to the predetermined scheme, the identification data.

In one embodiment, the RFID tag comprises a transceiver that communicates with the RFID reader, a processor, coupled to the transceiver, that encrypts, according to the predetermined scheme, the identification data, and a display, coupled to the processor, that displays an authentication code that a user of the RFID tag provides to the RFID reader as the authentication data.

In another embodiment, the present invention includes a method of transmitting information between a radio frequency identification (RFID) tag and a server, the method comprising the steps of transmitting identification data from the RFID tag to an RFID reader, receiving, by the RFID reader, authentication data, wherein the authentication data authenticates the RFID tag to the server, transmitting, from the RFID reader to the server, a transmission, wherein the transmission includes the identification data and the authentication data, and authenticating, by the server, the transmission using the authentication data and the identification data.

In one embodiment, the authentication data comprises a password.

In one embodiment, the authentication data comprises biometric information.

In one embodiment, the authentication data comprises a pseudo-random number.

In one embodiment, the pseudo-random number is generated by the RFID tag and displayed to a user, and wherein the server includes a synchronized pseudo-random number.

In another embodiment, the present invention includes a method of transmitting information between a radio frequency identification (RFID) tag and a RFID reader, the method comprising the steps of receiving, by the RFID tag from the RFID reader, first information, displaying at least a portion of the first information to a user, receiving a verification from the user to verify the first information, and transmitting identification data from the RFID tag to the RFID reader if the first information has been verified.

In one embodiment, the step of receiving a verification comprises activating a switch on the RFID tag to verify the first information.

In one embodiment, the first information comprises information about a transaction.

In one embodiment, the first information comprises a number or a code.

In one embodiment, the first information comprises an image.

In another embodiment, the present invention includes a radio frequency identification (RFID) tag for use in an RFID system including an RFID reader and a server, the RFID tag comprising a transceiver that communicates with the RFID reader, and a processor, coupled to the transceiver, that generates a pseudorandom number according to a predetermined scheme, and that encrypts identification data identifying the RFID tag using the pseudorandom number.

In one embodiment, the RFID tag further comprises a switch for activating the RFID tag.

In one embodiment, the RFID tag further comprises a switch, where the RFID tag receives information from a reader, and a user verifies the information from the reader and activates the tag using the switch, and the RFID tag transmits information to the reader only if the user verifies the information from the reader.

In one embodiment, the RFID tag further comprises a display, and the RFID tag receives information from a reader and displays the information to a user.

In one embodiment, the RFID tag further comprises a display, coupled to the processor, that displays the pseudorandom number.

In another embodiment, the present invention includes a radio frequency identification (RFID) tag for use in an RFID system including an RFID reader and a server, the RFID tag comprising a transceiver that communicates with the RFID reader, a processor, coupled to the transceiver, that encrypts, according a predetermined scheme, identification data that identifies the RFID tag, and that generates an authentication code, and a display, coupled to the processor, that displays the authentication code.

In one embodiment, the RFID tag further comprises a switch for activating the RFID tag.

In one embodiment, the RFID tag further comprises a switch, where the RFID tag receives information from a reader, and a user verifies the information from the reader and activates the tag using the switch, and the RFID tag transmits information to the reader only if the user verifies the information from the reader.

In one embodiment, the RFID tag receives information from a reader and displays the information to a user.

In one embodiment, the RFID tag displays the information from the reader to the user before the RFID tag sends an encrypted identification data to the reader.

In another embodiment, the present invention includes a radio frequency identification (RFID) tag for use in an RFID system including an RFID reader, the RFID tag comprising a switch for activating the RFID tag, a transceiver that communicates with the RFID reader, and a processor, coupled to the transceiver, that processes information received from the RFID reader.

In one embodiment, the present invention further comprises a display, coupled to the processor, that displays information received from the RFID reader.

In one embodiment, the RFID tag receives first information from the RFID reader and displays at least a portion of the first information to a user, and wherein identification data is transmitted from the RFID tag to the RFID reader if the first information has been verified using the switch.

In one embodiment, the RFID tag receives first information from the RFID reader if the switch is activated and the transceiver is disabled if the switch is deactivated.

The following detailed description and accompanying drawings provide a better understanding of the nature and advantages of the present invention.

DETAILED DESCRIPTION

Described herein are techniques for security in an RFID system. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Described herein are various methods and processes. Although the steps may be presented in a particular order, such order is shown for conciseness of description. Such order is not required except when a later step absolutely requires that a previous step be completed beforehand. As such, the steps may be performed in another order, in parallel, etc.

Figure 1:
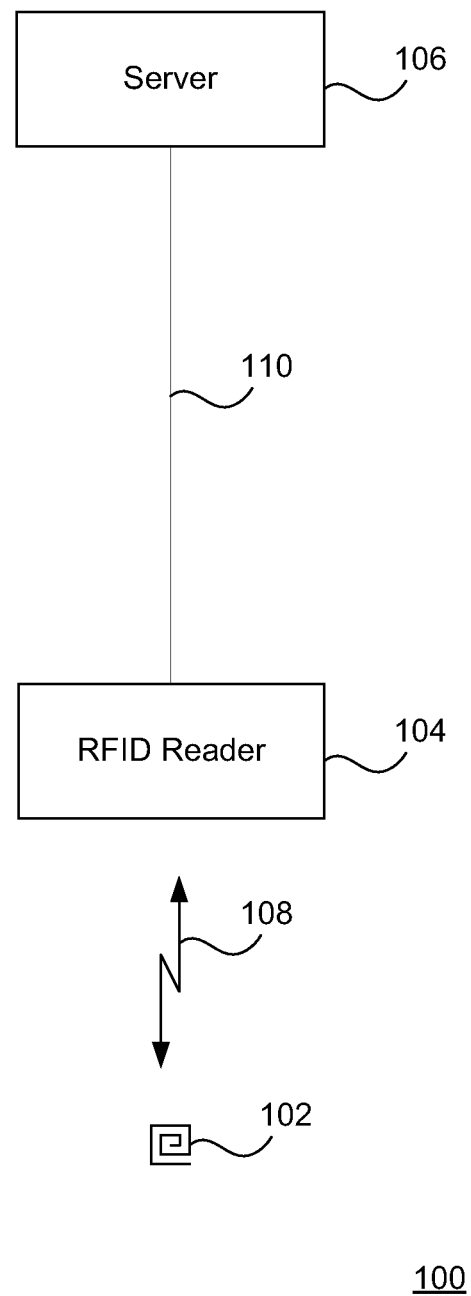
FIG. 1 is a block diagram of an RFID system according to an embodiment of the present invention.

FIG. 1 is a block diagram of an RFID system 100 according to an embodiment of the present invention. The RFID system 100 includes an RFID tag 102, a reader 104, and a server 106. The RFID tag 102 may be one of numerous RFID tags, the reader 104 may be one of numerous readers, and the server 106 may be one of numerous servers; one of each is shown for conciseness in the figure. The RFID tag 102 communicates with the reader 104 over a wireless link 108. Examples of implementations of the link 108 include a Bluetooth link, an ultrawideband (UWB) link, a backscattering link, or an optical link. The reader 104 communicates with the server 106 over a link 110. The link 110 may be a direct link (such as a dedicated wire link or a dedicated wireless link) or an indirect link (such as via a telecommunications network or the internet).

The following security concerns arise given the RFID system 100. One concern is the security of the link 110 from eavesdropping. Another concern is the security of the link 108 from eavesdropping or otherwise unrestricted reading of the RFID tag 102. Another concern is authentication of the reader 104 to the server 106. Another concern is unauthorized access to the RFID tag 102 by a reader other than the reader 104. Another concern is unauthorized access to the end-to-end transaction between the RFID tag 102 and the server 106. The present invention is directed toward addressing these and other security concerns.

Figure 2:
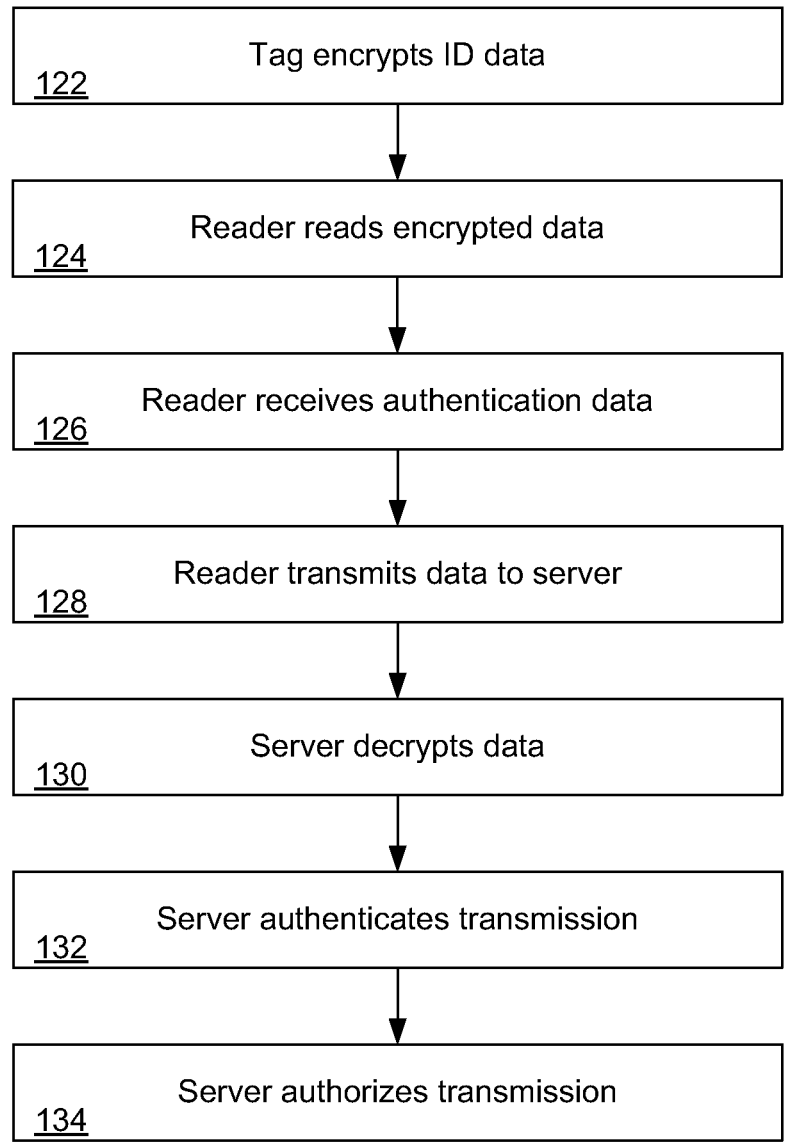
FIG. 2 is a block diagram of a method of operation of an RFID system according to an embodiment of the present invention.

FIG. 2 is a block diagram of a method 120 that describes the operation of the RFID system 100 (see FIG. 1) according to an embodiment of the present invention. In step 122, the RFID tag 102 encrypts identification data that identifies the RFID tag 102. The encrypted identification data may be referred to as encrypted RFID information. The encrypted RFID information may also include other information related to the RFID tag 102. The RFID tag 102 encrypts the data according to a predetermined scheme. Less than all of the data to be read from the tag may be encrypted if so desired.

In step 124, the reader 104 reads the encrypted RFID information from the RFID tag 102. Such reading may occur via backscattering, Bluetooth communications, UWB communications, optical reading, etc.

In step 126, the reader 104 receives authentication data that the server uses (see step 132 below) to authenticate the reader 104. The authentication data may be in the form of a code, a password, a personal identification number (PIN), or biometric information such as a fingerprint, etc. that the user of the RFID tag 102 may provide to the reader 104. The authentication data may also be or include a pseudorandom component. The pseudorandom component may be generated and displayed by the RFID tag 102 itself or by another device.

The authentication data assures that the reader 104 has been authorized by the user for a particular reading. For example, when the tag 102 is in an area with multiple readers, it may be read by more than one reader. The authentication data associates the RFID tag 102 with the reader 104, and the other readers will lack the authentication data. Similarly, if a malicious reader collects data by surreptitiously reading tags, the malicious reader will lack the authentication data, and will be unable to provide it to the server for authentication (see step 132 below). Thus, even though the RFID tag 102 may be read by a malicious reader, the malicious reader can do nothing with the information.

In step 128, the reader 104 transmits the encrypted RFID information and the authentication data to the server 106. The transmission from the reader 104 to the server 106 may itself be encrypted. Such encryption may be performed using an algorithm unrelated to the RFID processing otherwise discussed in this patent disclosure. Such encryption may also be performed using information related to the RFID processing discussed in this patent disclosure; for example, the transmission from the reader 104 to the server 106 may be encrypted using the authentication data.

In step 130, the server 106 decrypts the encrypted RFID information according to the predetermined scheme to produce in the identification data. The server 106 may use the identification data to associate the RFID tag 102 with other stored data. For example, a bank server may associate the identification data from the RFID tag 102 with an account number associated with the user's bank account.

In step 132, the server 106 authenticates the transmission from the reader 104 using the authentication data and the identification data. The server 106 has a database that associates the identification data with target authentication data. If the authentication data includes a pseudorandom component, the server 106 also generates a target pseudorandom component according to the same scheme used by the RFID tag 102. The server 106 then compares the authentication data from the reader 104 with the target authentication data to authenticate the transmission. For example, if the authentication data is a PIN, the server 106 compares the PIN to a target PIN associated with the identification data. If the PIN from the reader matches the target PIN, the transmission from the reader is authenticated. The server 106 may transmit an acknowledgement to the reader 104 to indicate whether the transmission has been authenticated. After the transmission has been authenticated, the method 120 proceeds to step 134.

In step 134, the server 106 authorizes the transmission from the reader 104 using the identification data. The server 106 may transmit an acknowledgement to the reader 104 to indicate whether the transmission has been authorized.

Alternatively, the authentication step may be performed before the decryption step in cases where the server 106 receives information from the reader 104 sufficient to perform the authentication.

The method 120 may be used to authorize a transaction involving the RFID tag 102 and the reader 104. For example, the RFID tag 102 may be incorporated in a bank card, and the reader 104 may be a point of sale terminal in a store. In step 126 additionally, the reader 104 may receive transaction information, for example, a dollar amount corresponding to a purchase the user desires to make. In step 128 additionally, the reader 104 transmits the transaction information to the server 106. In step 132 additionally, the server 106 authenticates the transaction. In step 134 additionally, the server 106 authorizes the transaction, for example, by debiting the user's bank account balance by the dollar amount of the transaction and by crediting the store. The server 106 may acknowledge, for example, the user's new balance to the reader 104.

According to other embodiments, the encryption key may be modified as desired. According to a first option, the encryption key may be used for a defined period of time (which may be referred to as a "validity period"). According to a second option, a different encryption key may be used each time the tag is read. According to a third option, a different encryption key may be used depending upon the type of read request that the tag receives.

FIGS. 3-6 concern various methods of selecting or generating an encryption key (also referred to as a "key"). The key may be generated as a pseudorandom number. The key may be used for encryption (step 122 of FIG. 2) and decryption (step 130 of FIG. 2).

Figure 3:
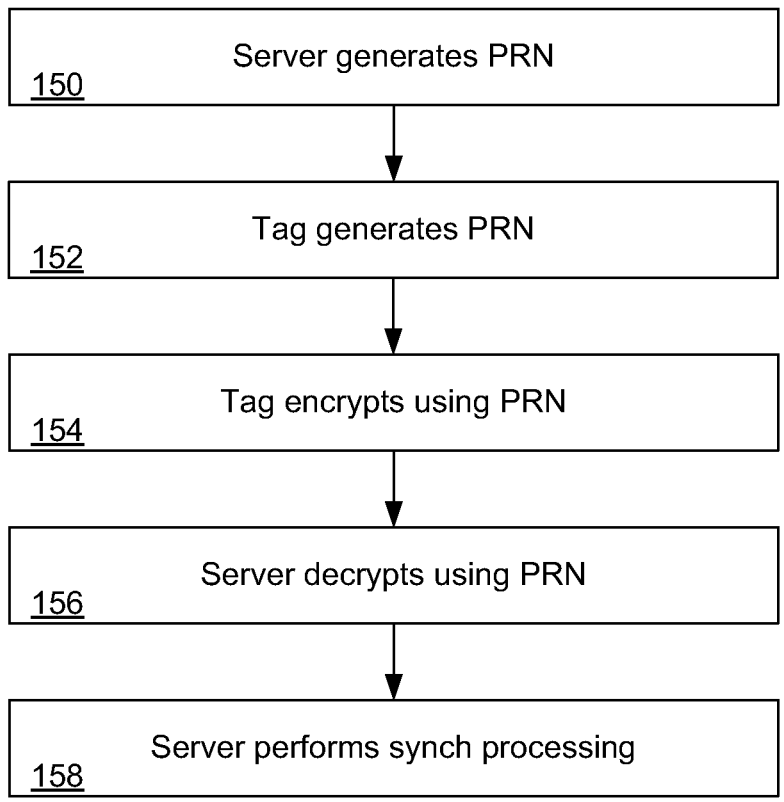
FIG. 3 is a block diagram of a method of key generation according to an embodiment of the present invention.

FIG. 3 is a block diagram of a method of key generation according to an embodiment of the present invention. This method is suitable for use when the RFID tag 102 has a continuous source of power.

In step 150, the server 106 generates a pseudorandom number ("PRN") according to a predetermined scheme. The predetermined scheme may involve bit shifting, transforming, or logically operating upon a previously-generated pseudorandom number. The scheme may involve computing the pseudorandom number at a defined rate.

In step 152, the RFID tag 102 generates a pseudorandom number according to the predetermined scheme. Since the RFID tag 102 and the server 106 generate their pseudorandom numbers according to the same scheme, the pseudorandom numbers will match.

In step 154, the RFID tag 102 encrypts the identification data using the pseudorandom number. For example, the RFID tag 102 may perform an exclusive OR operation on the identification data and the pseudorandom number as the encryption operation. The pseudorandom number may be used for a defined validity period, for example one minute, before the next pseudorandom number resulting from the scheme is used for encryption.

In step 156, the server 106 decrypts the encrypted RFID information using the pseudorandom number. For example, the server 106 may perform an exclusive OR operation on the encrypted RFID information and the pseudorandom number as the decryption operation. If the decryption fails or otherwise results in meaningless data, the method proceeds to step 158.

In step 158, the server 106 performs synchronization contingency processing. If the decryption of step 156 fails, it may be because the server has updated its pseudorandom number in the time the reader 104 was reading the RFID tag 102, or because of delays in transmission from the reader 104 to the server 106, or because the RFID tag 102 and the server 106 are out of synchronization. For example, if the RFID tag 102 is read near the end of the validity period, the server 106 may not receive the encrypted RFID information until the next validity period has been entered. To resolve these issues, the server 106 uses one or more of the previous (or next) pseudorandom numbers to perform the decryption of step 156. If the decryption still fails, this indicates that the transmission may be unauthorized or that the circuitry of the RFID tag 102 may be defective.

As can be seen from the above description, the method of FIG. 3 is suitable for use when the PRN in RFID tag 102 is reasonably synchronous with respect to the server 106.

The process otherwise occurs as described above regarding FIG. 2.

Figure 4:
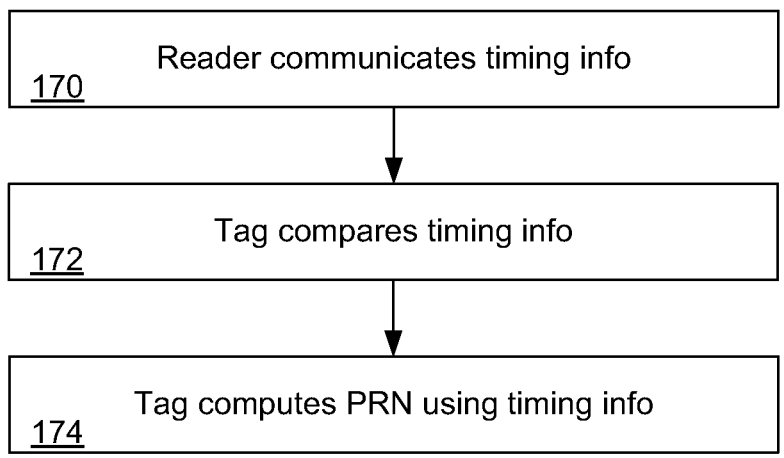
FIG. 4 is a block diagram of a method of key generation according to another embodiment of the present invention.

FIG. 4 is a block diagram of a method of key generation according to another embodiment of the present invention. This method is suitable for use when the RFID tag 102 does not have a continuous source of power.

In step 170, the reader 104 communicates timing information to the RFID tag 102. This communication may occur when the reader 104 is reading the RFID tag 102.

In step 172, the RFID tag 102 compares the timing information received in step 170 with stored timing information from the last time the RFID tag 102 was active. This comparison may result in a timing interval. For example, if the stored timing information is 12:00:00 and the timing information communicated in step 170 is 12:50:00, the timing interval is 50:00.

In step 174, the RFID tag 102 computes the pseudorandom number using the predetermined scheme (see step 152 in FIG. 3), further according to the timing interval. Namely, the use of the timing interval allows the RFID tag 102 to compute the pseudorandom number as if it had been continuously computing the pseudorandom number over the period that the RFID tag 102 has been inactive.

For example, assume that the RFID tag 102 takes 0.001 seconds to generate the next pseudorandom number given the present pseudorandom number, for a given validity period. Assume that the validity period is 100 seconds, and that the timing interval is 100,000 seconds. Thus, 1000 validity periods have passed since the RFID tag 102 was last active. The RFID tag 102 then takes 1 second to execute the 1000 generation operations necessary to generate the current pseudorandom number. In another embodiment, timing information may be transmitted from the server to the tag via the reader.

The process otherwise occurs as described above regarding FIG. 2.

Figure 5:
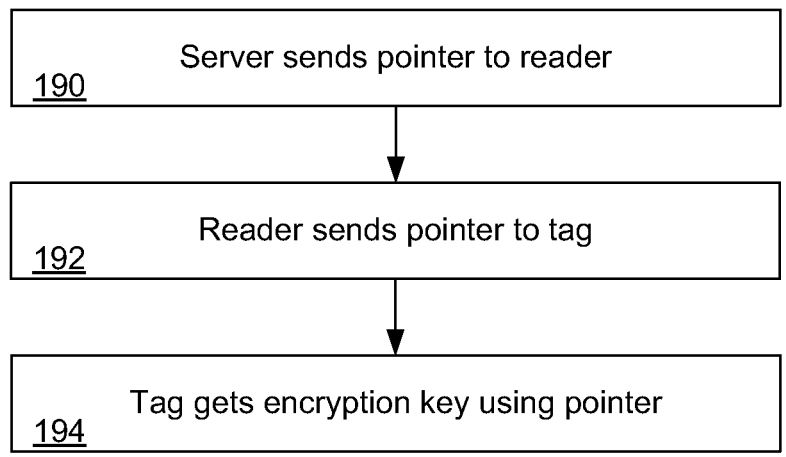
FIG. 5 is a block diagram of a method of key generation according to another embodiment of the present invention.

FIG. 5 is a block diagram of a method of key generation according to another embodiment of the present invention. This method is suitable for use when the RFID tag 102 does not have a continuous source of power.

To set up the method of FIG. 5, assume that the server 106 stores a set of encryption keys and that the RFID tag 102 stores a copy of the set of encryption keys. The encryption keys may be referenced by a pointer. Thus, if the server 106 selects one of the encryption keys to use, it may communicate the pointer to the RFID tag 102, which may then select the corresponding encryption key using the pointer.

In step 190, the server 106 sends to the reader 104 a pointer to one of a set of encryption keys stored by the server 106. The encryption keys may be pseudorandom numbers. In step 192, the reader 104 transmits the pointer to the RFID tag 102. This transmission may occur when the reader 104 is attempting to read the RFID tag 102. In step 194, the RFID tag 102 uses the pointer to identify a corresponding encryption key from its own stored set of encryption keys. This set corresponds to the set stored by the server 106, so both encryption keys match.

The process otherwise occurs as described above regarding FIG. 2.

Alternatively, the reader 104 may select the pointer. In such case, the reader 104 informs the server 106 of the pointer selected, for example, as part of the transmission step 128 (see FIG. 2).

Figure 6:
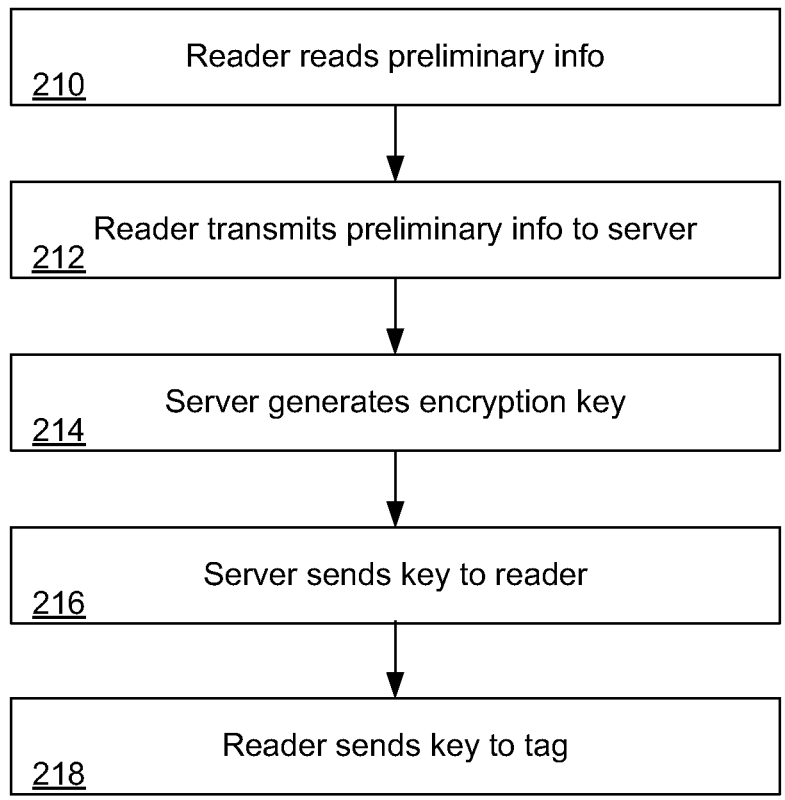
FIG. 6 is a block diagram of a method of key generation according to another embodiment of the present invention.

FIG. 6 is a block diagram of a method of key generation according to another embodiment of the present invention. This method is suitable for use when the RFID tag 102 does not have a continuous source of power.

In step 210, the reader 104 reads preliminary information from the RFID tag 102. The preliminary information may be a partial tag ID. In step 212, the reader 104 transmits the preliminary information to the server 106. In step 214, the server 106 uses the preliminary information to generate or select an encryption key, which may be a pseudorandom number. In step 216, the server 106 sends the encryption key to the reader 104. In step 218, the reader 104 sends the encryption key to the RFID tag 102.

The process otherwise occurs as described above regarding FIG. 2.

Alternatively, the server 106 and the RFID tag 102 may use the communicated encryption key as a starting point to generate, according to a common scheme, a pseudorandom number for use in encrypting and decrypting. As discussed above, since each pseudorandom number is generated according to the same scheme, the pseudorandom numbers will match.

As a further alternative, the server 106 may select a pointer in step 214. In such case, the method proceeds in a manner similar to that described above in FIG. 5.

Figure 7:
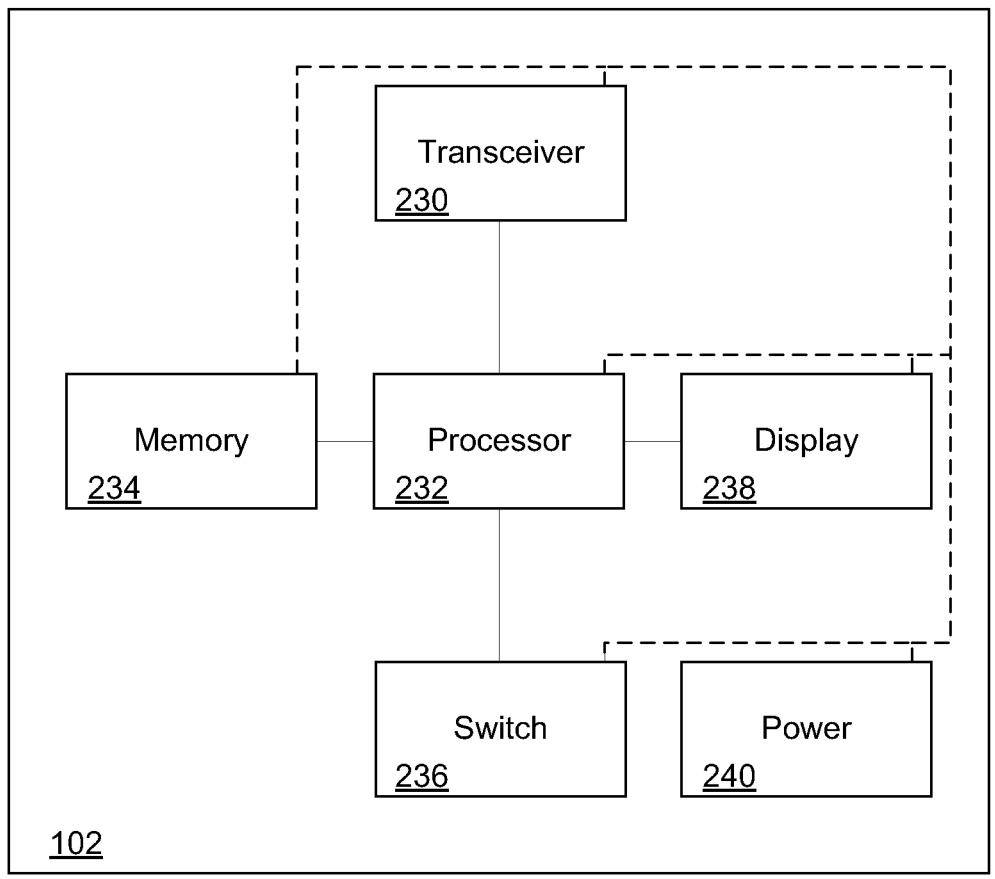
FIG. 7 is a block diagram of an RFID tag according to an embodiment of the present invention.

FIG. 7 is an example block diagram showing components that may be included on an RFID tag 102 according to an embodiment of the present invention. The RFID tag 102 may include a transceiver 230, a processor 232, a memory 234, a switch 236, a display 238, and a power supply 240. These components may be composed of one or more circuit elements. It is to be understood that some tags may not include all of these components (e.g., power supply 240).

The transceiver 230 wirelessly links the RFID tag 102 with the reader 104. If the RFID tag 102 is an active tag, the transceiver 230 may transmit radio signals. If the RFID tag 102 is a passive tag, the transceiver 230 operates according to backscattering.

The processor 232 controls the operation of the RFID tag 232. For embodiments that involve pseudorandom numbers, the processor 232 generates the pseudorandom numbers. The processor 232 may receive timing information from an oscillator (not shown).

The memory 234 stores information used by the RFID tag 102. Such information may include the tag ID or other identification information, a set of pointers and encryption keys (see FIG. 5 and related description), and other information.

The switch 236 controls activation of the RFID tag 102. (If activation control of the RFID tag 102 is undesired, the switch 236 may be omitted.) The switch 236 may be implemented as a button, as a toggle switch, as an input processing system (for example, for entering a PIN, code or password), or as a biometric processing system (for example, for comparing an input fingerprint with stored data of the user's fingerprint), or another equivalent data entry system. As an alternative to the switch 236, the RFID tag 102 may be kept inactive by placing it in an RFID blocking sleeve. When the RFID tag 102 is inactive, it does not respond to reading by a reader. Thus, activation reduces the effectiveness of a malicious reader, because the RFID tag 102 may be inactive when the malicious reader attempts to read it.

The display 238 displays information related to the operation of the RFID tag 102. (If such information display is undesired, the display 238 may be omitted.) The display 238 may display status information, such as whether the RFID tag 102 has successfully communicated with a reader or a server. The display 238 may display day, date or time information. The display 238 may also display authentication data such as a pseudorandom component as described above (see step 126 of FIG. 2).

The power supply 240 may be used to power an active tag or to power the RFID tag 102 as required for synchronization with the server 106 (for example, for synchronizing the generation of pseudorandom numbers as described above with reference to FIG. 3). The power supply 240 may be omitted from the RFID tag 102 as desired, for example, in a passive tag or when synchronization with the server 106 is undesired.

The benefits realized by different embodiments or implementations of the present invention may include one or more of the following alone or in combination. First, the reader 104 need not decrypt the encrypted RFID information. The reader 104 acts as a conduit for the encrypted RFID information. Neither the server 106 nor the RFID tag 102 needs to "trust" the reader 104. Thus, even if an unauthorized reader reads the RFID tag 102, the unauthorized reader will have to expend significant processing resources in order to crack the encrypted RFID information. It therefore becomes unprofitable for a malicious entity to use unauthorized readers in an attempt to collect RFID information.

Second, the server 106 uses the authentication data to authenticate the reader 104. Even if an unauthorized reader reads the RFID tag 104 and sends a transmission to the server 106, the server 106 uses the authentication data to reject the transmission. It therefore becomes unprofitable for a malicious entity to transmit unauthorized transactions to the server 106.

Third, the user may activate the RFID tag 102 prior to step 124. Prior to activation, the RFID tag 102 does not respond to being read. Such activation can take many forms, such as pushing a button, toggling a switch, removing the tag from an RFID blocking sleeve, entering a password, or providing biometric information (such as a fingerprint). Such activation prevents the RFID tag 102 from responding to indiscriminate reading, instead responding only after the user has activated the tag. It therefore becomes unprofitable for a malicious entity to indiscriminately read RFID tags.

In this manner, the embodiments of the present invention address the security concerns discussed above with reference to FIG. 1.

In one embodiment, the switch 236 may be used to activate the tag for further actions. However, in another embodiment, the tag may already be active, and switch 236 may be used to verify information received from a reader. For example, a tag may be in an active state for communicating with a reader. Before the tag sends information (e.g., an RFID) to the reader, it first may receive information from the reader, such as a number, code, an image (e.g., a picture), or information about a transaction, which may be shown on a display 238, for example. A user may be presented with information (e.g., on a display) received by the tag, and the user may verify the information by activating switch 236. In response to the user's activation of the switch, the tag may send the tag ID to the reader. Accordingly, a switch 236, which may be one switch or multiple switches, may be used to activate the tag or authorize the tag to send the tag identification, or both. Verification of information received from a reader, and authorization using a data input system such as a switch, allows the system to avoid access to a tag by malicious readers.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method of transmitting information between a radio frequency identification (RFID) tag and a server, said method comprising the steps of:
   determining, by said RFID tag, an encryption key based on a communication received from an RFID reader after said RFID tag is activated;
   encrypting, by said RFID tag according to a predetermined scheme and the encryption key, identification data identifying said RFID tag, to result in encrypted RFID information;
   reading, by said RFID reader, said encrypted RFID information from said RFID tag;
   transmitting, from said RFID reader to said server, a transmission, wherein said transmission includes said encrypted RFID information; and
   decrypting, by said server according to said predetermined scheme, said encrypted RFID information to produce said identification data.

2. The method of claim 1, further comprising:
   authorizing, by said server, said transmission using said identification data.

3. The method of claim 1, further comprising:
   receiving, by said RFID reader, authentication data, wherein said authentication data authenticates said RFID tag to said server, and wherein said transmission, from said RFID reader to said server, includes said authentication data;
   authenticating, by said server, said transmission using said authentication data and said identification data.

4. The method of claim 3, wherein:
   said step of receiving comprises receiving, by said RFID reader, said authentication data and transaction information, wherein said authentication data authenticates said RFID tag to said server, and wherein said transaction information relates to a transaction involving said RFID tag and said RFID reader; and
   said step of transmitting comprises transmitting, from said RFID reader to said server, said transmission, wherein said transmission includes said encrypted RFID information, said transaction information, and said authentication data.

5. The method of claim 4, further comprising:
   authenticating, by said server, said transaction using said authentication data and said identification data; and
   authorizing, by said server, said transaction using said identification data and said transaction information.

6. The method of claim 3, wherein said authentication data comprises a password, biometric information, or a pseudo-random number.

7. The method of claim 3, wherein said RFID tag displays an authentication code that a user of said RFID tag provides to said reader as said authentication data.

8. The method of claim 1, wherein:
   after said RFID tag is activated, said communication received from said RFID reader is timing information; and
   said encryption key is determined based on said timing information.

9. The method of claim 1, wherein:
   said RFID tag is activated with one of a switch, biometric information, or a password.

10. The method of claim 1, further comprising:
    generating, by said RFID tag prior to said step of encrypting, a pseudorandom number, wherein said step of encrypting is performed using said pseudorandom number.

11. The method of claim 1, wherein said server generates said encryption key and transmits said encryption key to said RFID tag, wherein said RFID tag uses said encryption key when encrypting, and wherein said server uses said encryption key when decrypting.

12. The method of claim 1, wherein said server generates said encryption key and transmits said encryption key to said RFID tag, wherein said RFID tag updates said encryption key according to a defined process to result in an updated encryption key, wherein said RFID tag uses said updated encryption key when encrypting, wherein said server updates said encryption key according to said defined process to result in said updated encryption key, and wherein said server uses said updated encryption key when decrypting.

13. The method of claim 1, wherein said step of reading is performed by backscattering.

14. An apparatus including a radio frequency identification (RFID) system, said RFID system comprising:
   an RFID tag;
   an RFID reader that communicates with said RFID tag; and
   a server that communicates with said RFID reader
   wherein said RFID tag determines an encryption key based on a communication received from an RFID reader after said RFID tag is activated;
   wherein said RFID tag encrypts, according to a predetermined scheme and the encryption key, identification data identifying said RFID tag, to result in encrypted RFID information,
   wherein said RFID reader reads said encrypted RFID information from said RFID tag, wherein said RFID reader transmits a transmission to said server, wherein said transmission includes said encrypted RFID information, and wherein said server decrypts, according to said predetermined scheme, said encrypted RFID information to produce said identification data.

15. The apparatus of claim 14 wherein said server authorizes said transmission using said identification data.

16. The apparatus of claim 14 wherein said RFID reader receives authentication data, wherein said transmission, from said RFID reader to said server, includes said authentication data, and wherein said authentication data authenticates said RFID tag to said server.

17. The apparatus of claim 16 wherein said server authenticates said transmission using said authentication data and said identification data.

18. The apparatus of claim 16, wherein:
said RFID reader receives said authentication data and transaction information, wherein said transaction information relates to a transaction involving said RFID tag and said RFID reader;
said transmission includes said encrypted RFID information, said transaction information, and said authentication data;
said server authenticates said transaction using said authentication data and said identification data; and
said server authorizes said transaction using said identification data and said transaction information.

19. The apparatus of claim 14, wherein said RFID tag comprises:
a transceiver that communicates with said RFID reader; and
a processor, coupled to said transceiver, that encrypts, according to said predetermined scheme, said identification data.

20. The apparatus of claim 14, wherein said RFID tag comprises:
a transceiver that communicates with said RFID reader;
a memory that stores a plurality of encryption keys; and
a processor, coupled to said transceiver and to said memory, that encrypts, according to said predetermined scheme, said identification data using a selected one of said plurality of encryption keys stored in said memory as said encryption key based on said communication received from an RFID reader after said RFID tag is activated.

* * * * *